(12) United States Patent
Amend

(10) Patent No.: US 8,650,823 B2
(45) Date of Patent: Feb. 18, 2014

(54) SUBFLOOR COMPONENT AND METHOD OF MANUFACTURING SAME

(76) Inventor: Victor Amend, Toronto (CA)

(*) Notice: Subject to any disclaimer, the term of this patent is extended or adjusted under 35 U.S.C. 154(b) by 0 days.

(21) Appl. No.: 13/412,038

(22) Filed: Mar. 5, 2012

(65) Prior Publication Data

US 2013/0227903 A1  Sep. 5, 2013

(51) Int. Cl.
*E04C 1/00* (2006.01)

(52) U.S. Cl.
USPC ............................ 52/309.8; 52/309.4; 52/408

(58) Field of Classification Search
USPC ............ 52/302.1, 302.3, 302.4, 309.1, 309.3, 52/309.4, 309.8, 309.9, 403.1, 413, 169.5, 52/169.14, 385, 386, 389, 408–410, 52/789.1; 428/156, 158, 167, 172, 220, 428/318.4, 318.8
See application file for complete search history.

(56) References Cited

U.S. PATENT DOCUMENTS

| | | | | |
|---|---|---|---|---|
| 4,924,645 A | * | 5/1990 | Abeln | 52/177 |
| 4,945,697 A | * | 8/1990 | Ott et al. | 52/403.1 |
| 5,671,575 A | * | 9/1997 | Wu | 52/403.1 |
| 5,695,870 A | * | 12/1997 | Kelch et al. | 428/318.4 |
| 5,860,259 A | * | 1/1999 | Laska | 52/302.3 |
| 6,468,629 B1 | * | 10/2002 | Lodder | 428/158 |
| 6,607,803 B2 | * | 8/2003 | Foster | 428/77 |
| 6,918,215 B2 | | 7/2005 | Smith | |
| 2005/0158517 A1 | * | 7/2005 | Rives et al. | 428/158 |
| 2008/0066419 A1 | * | 3/2008 | Stanchfield et al. | 52/716.1 |
| 2008/0086958 A1 | * | 4/2008 | Schroer et al. | 52/169.14 |
| 2009/0126307 A1 | * | 5/2009 | Grohman et al. | 52/588.1 |
| 2011/0045250 A1 | * | 2/2011 | De Zen | 428/168 |
| 2011/0197543 A1 | * | 8/2011 | Lee et al. | 52/745.05 |

* cited by examiner

*Primary Examiner* — Brian Glessner
*Assistant Examiner* — Beth Stephan

(57) ABSTRACT

A subfloor component includes an insulating foam panel having first and second opposing faces and a plurality of intersecting grooves to define, in cross-section, a plurality of pedestals having walls that extend into the panel from the first face toward the second face. The subfloor component also includes a moisture-resistant film attached to the first face of the panel and that conforms to the pedestals, and a hardboard layer on the second face of the panel. A method of manufacturing subfloor components is also disclosed.

18 Claims, 18 Drawing Sheets

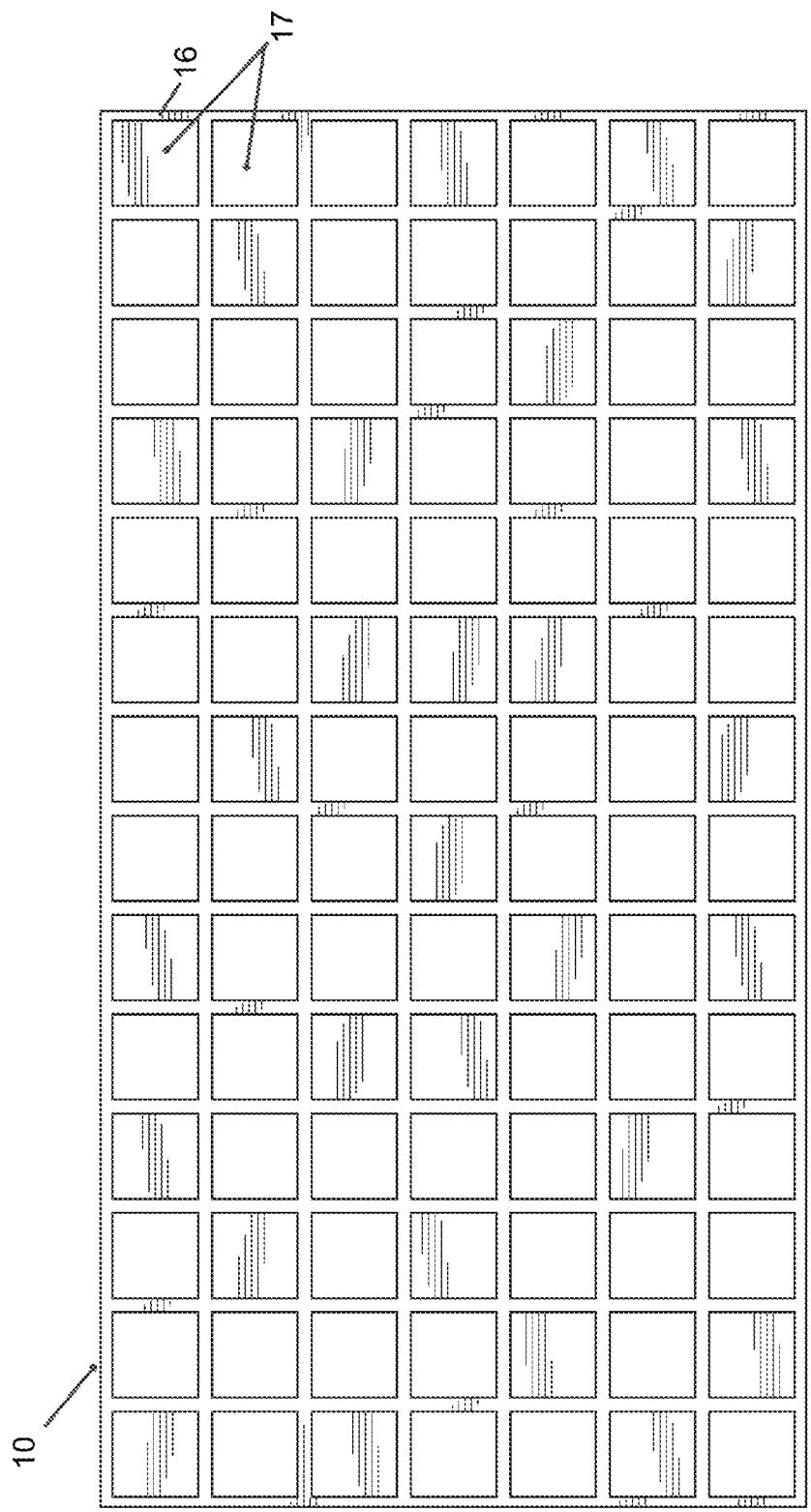
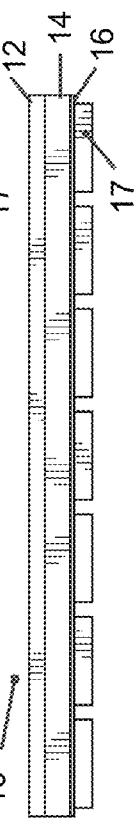
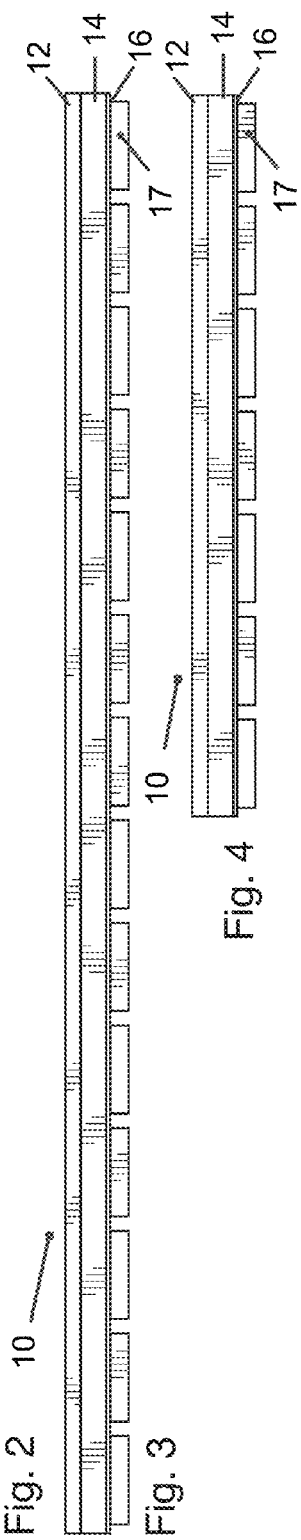
Fig. 2
Fig. 3
Fig. 4

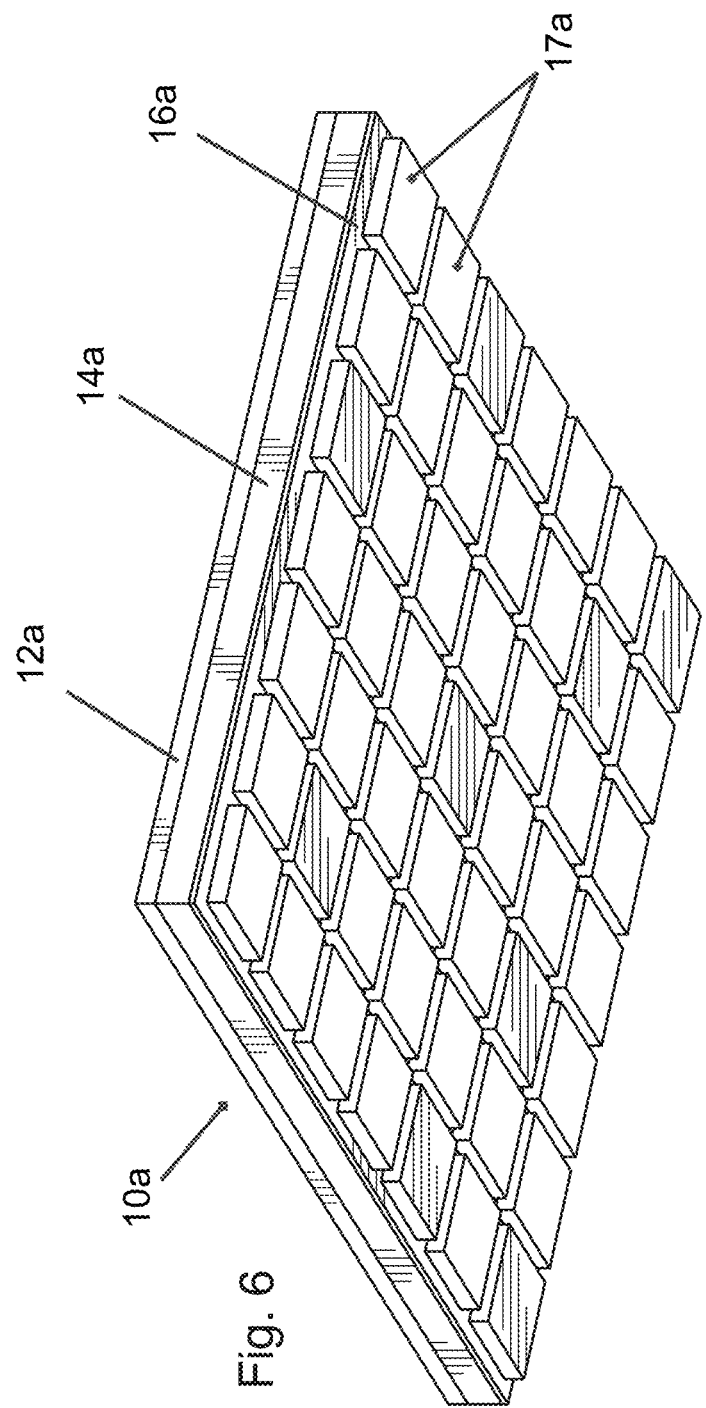

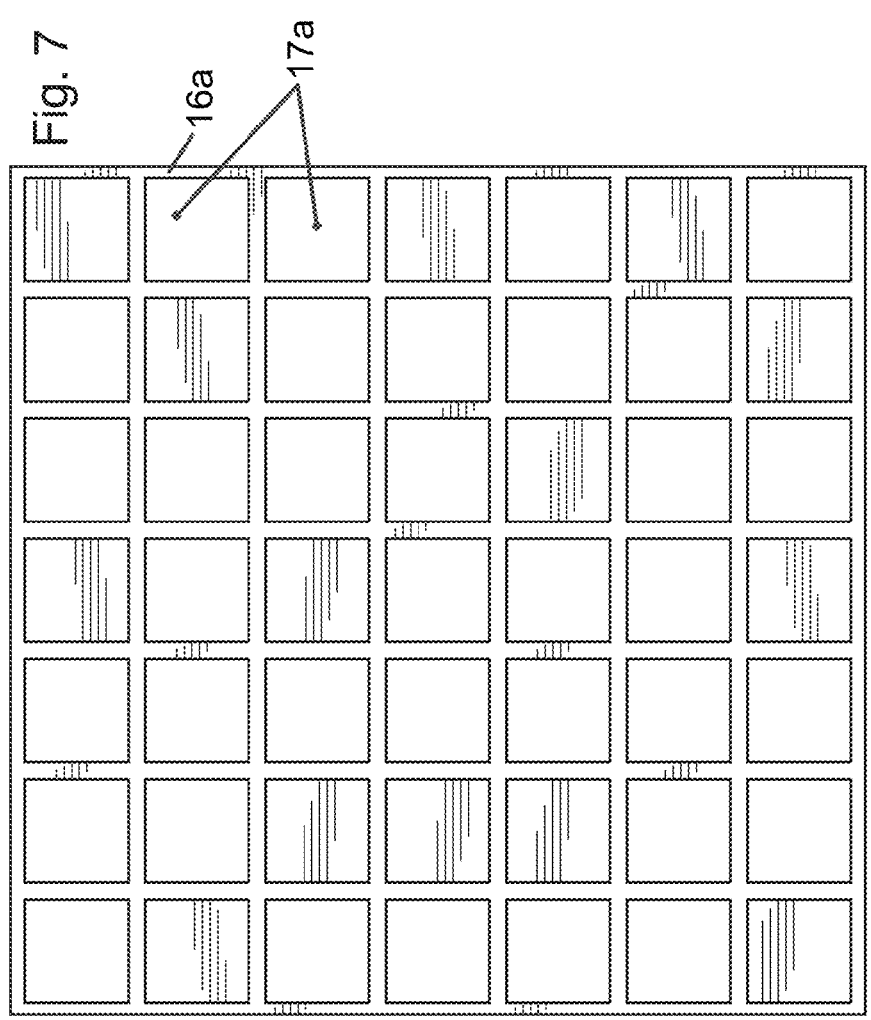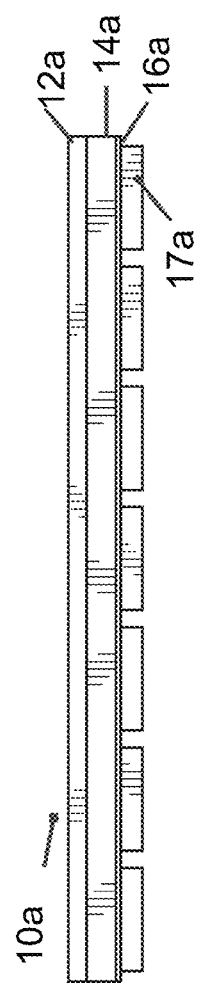

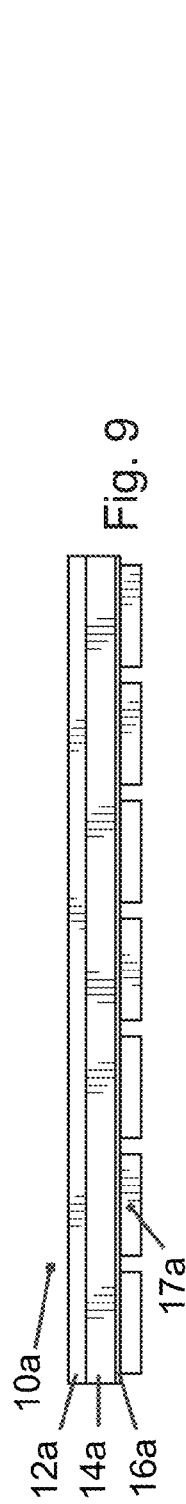
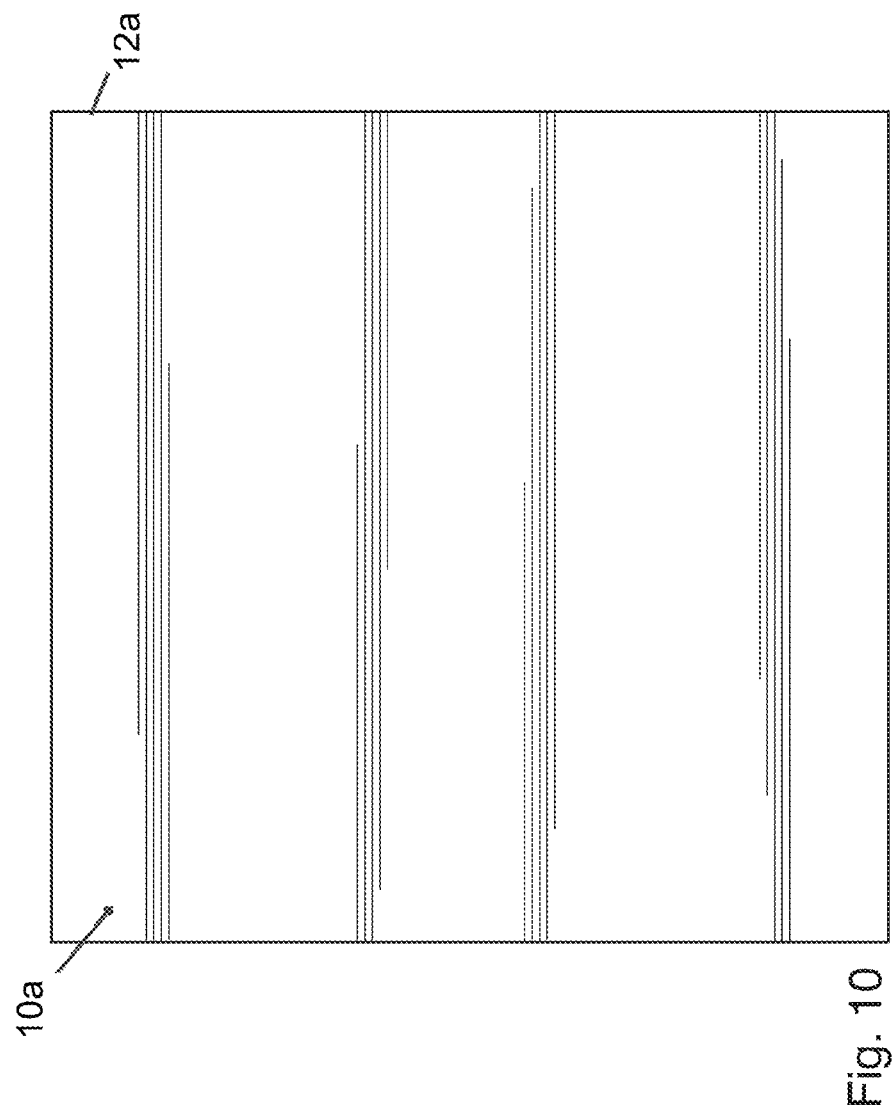

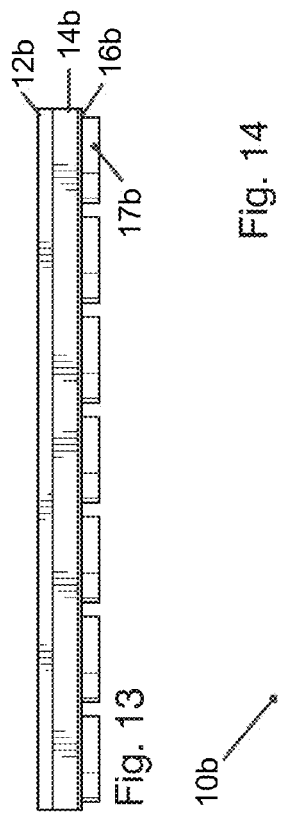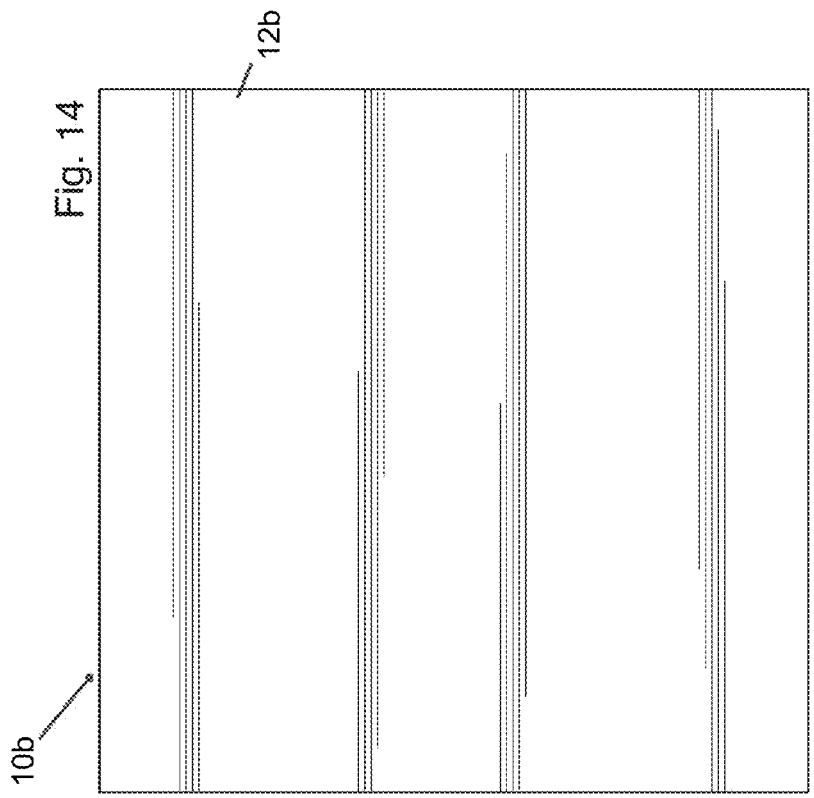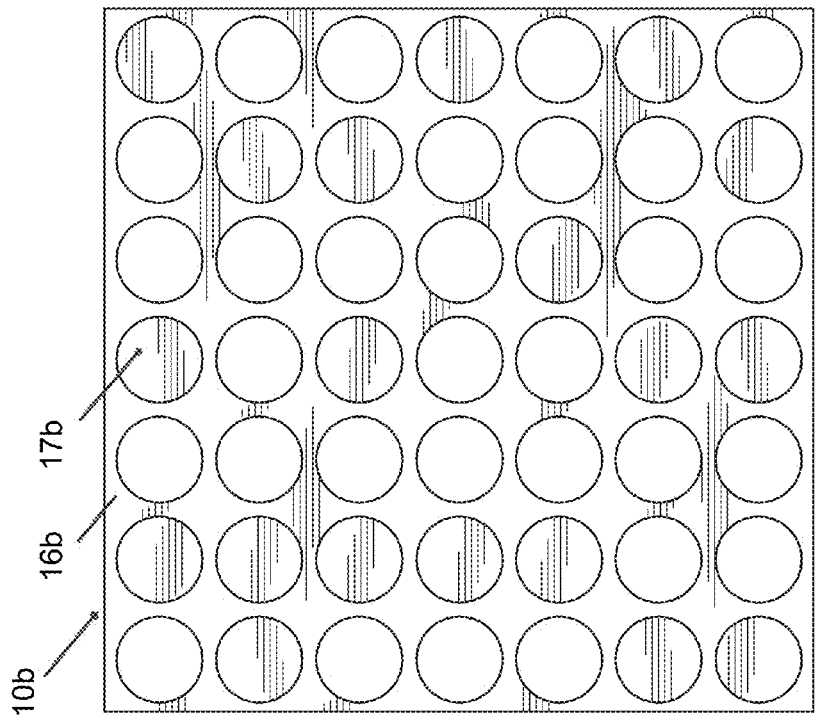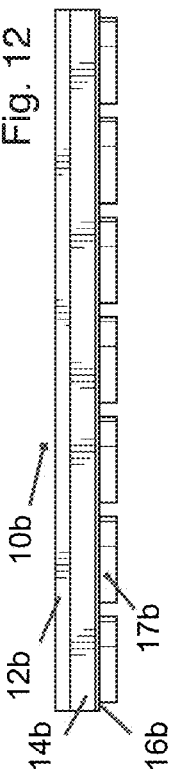

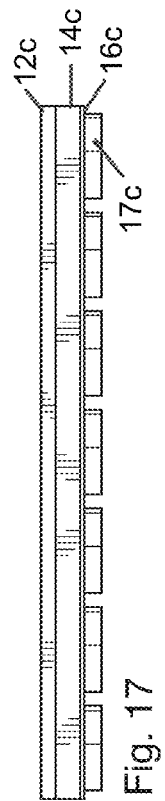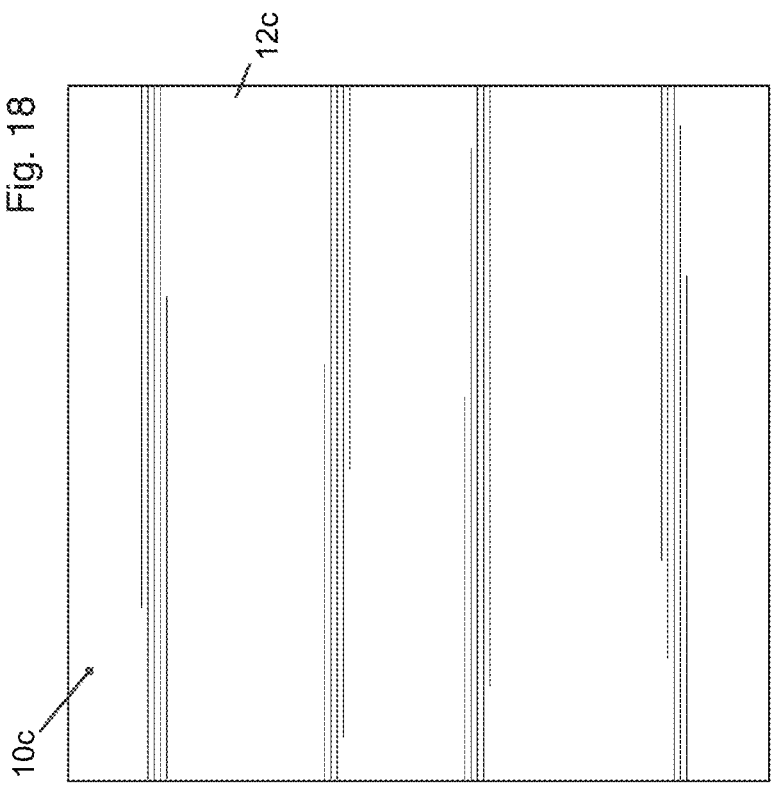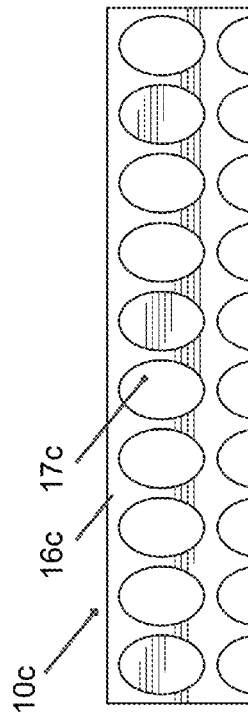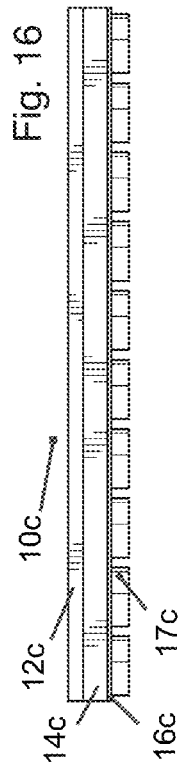

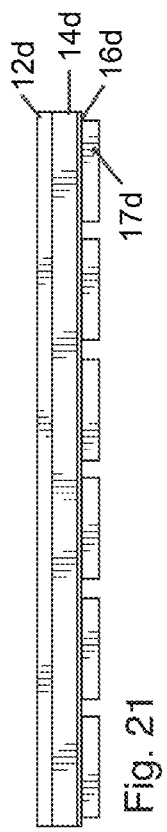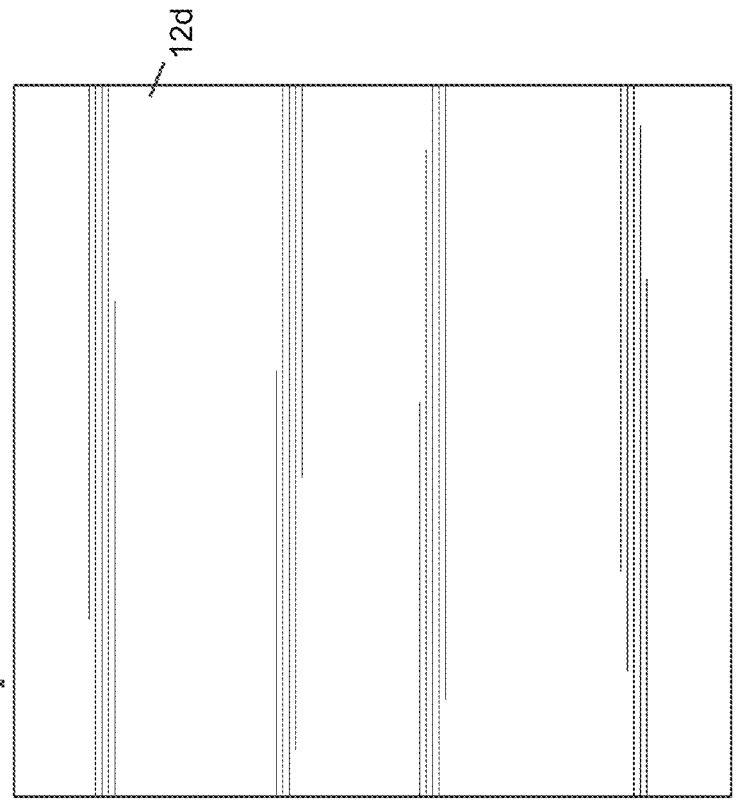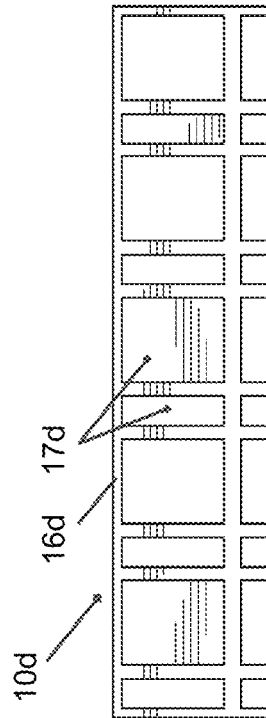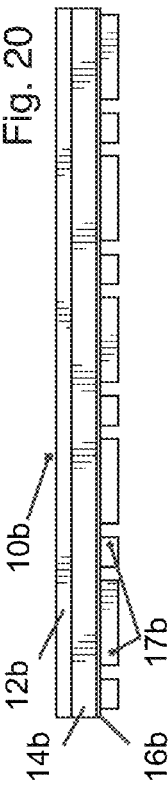

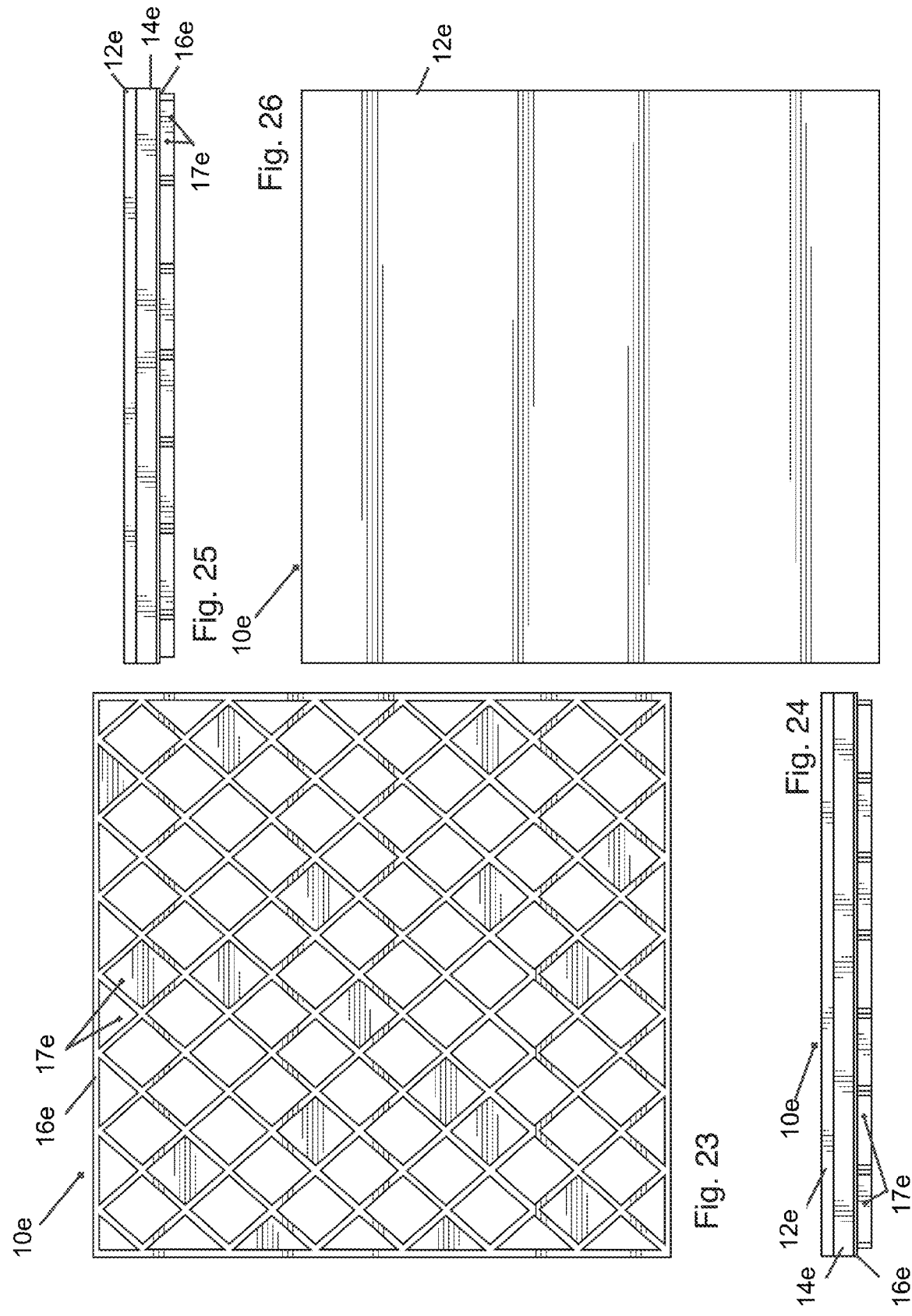

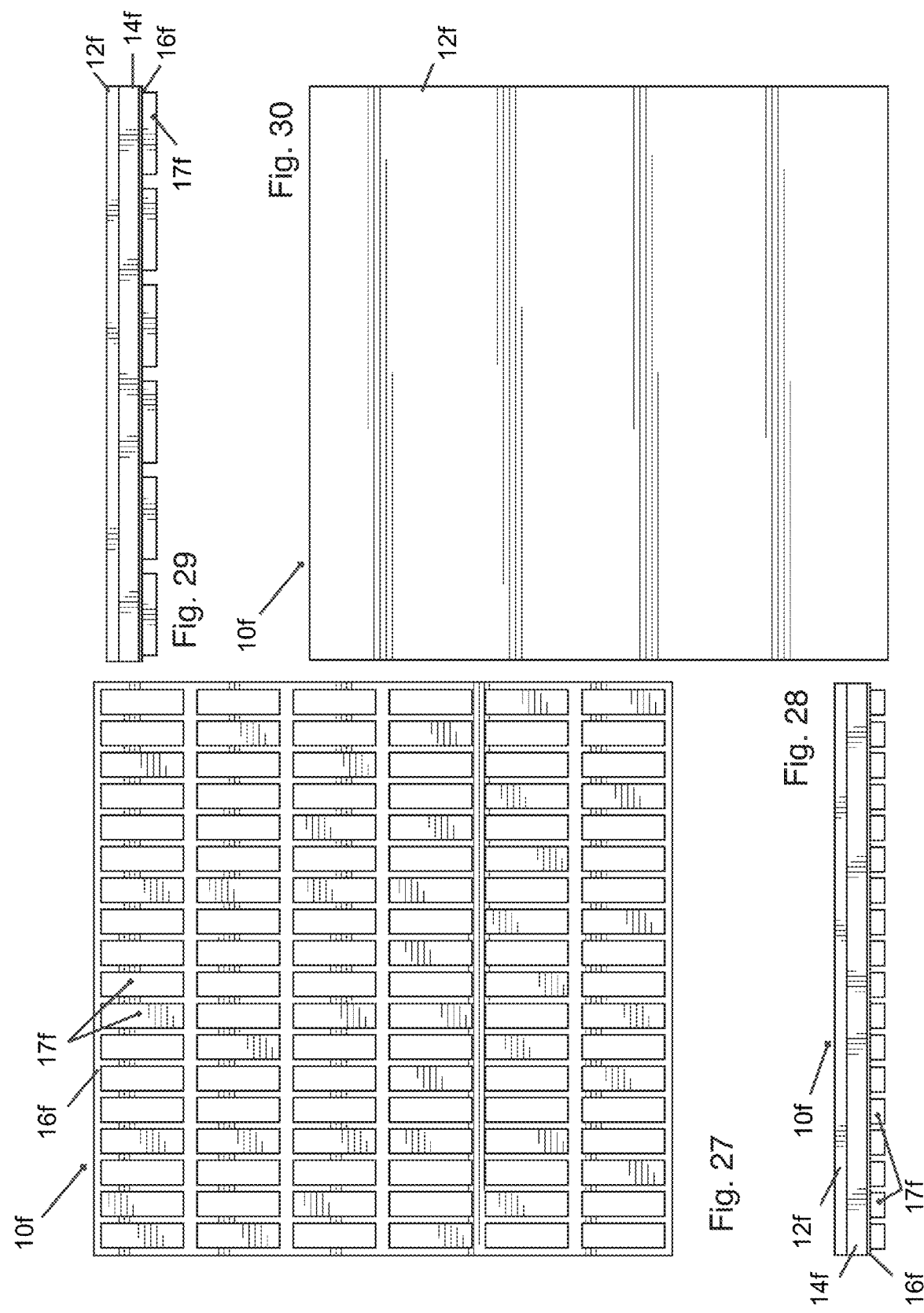

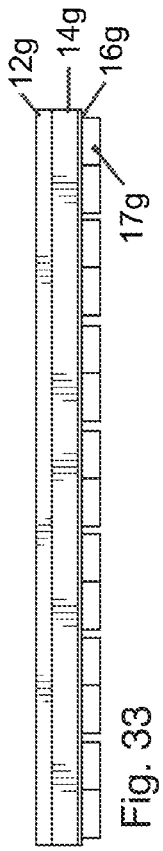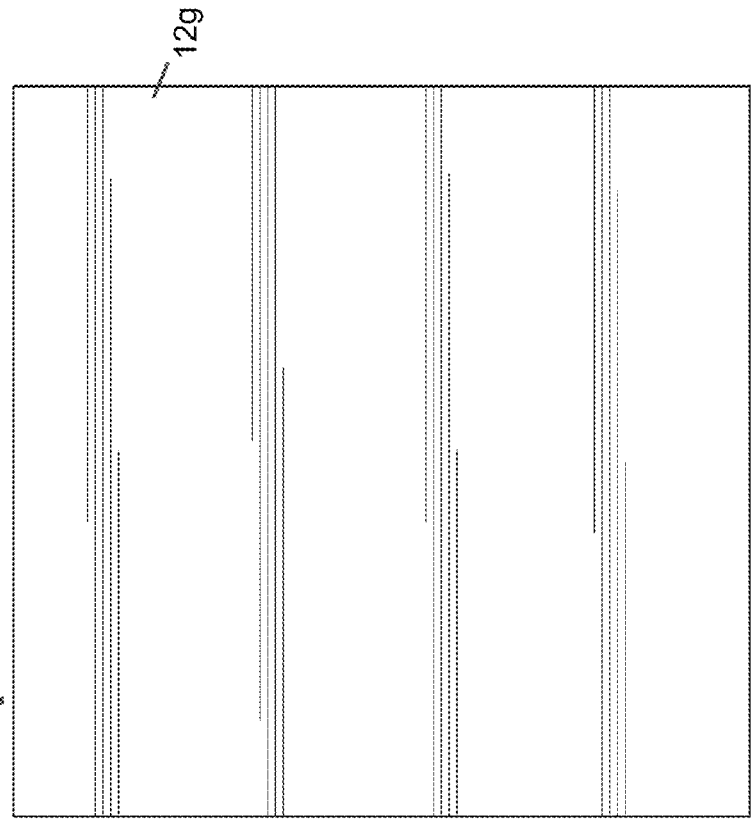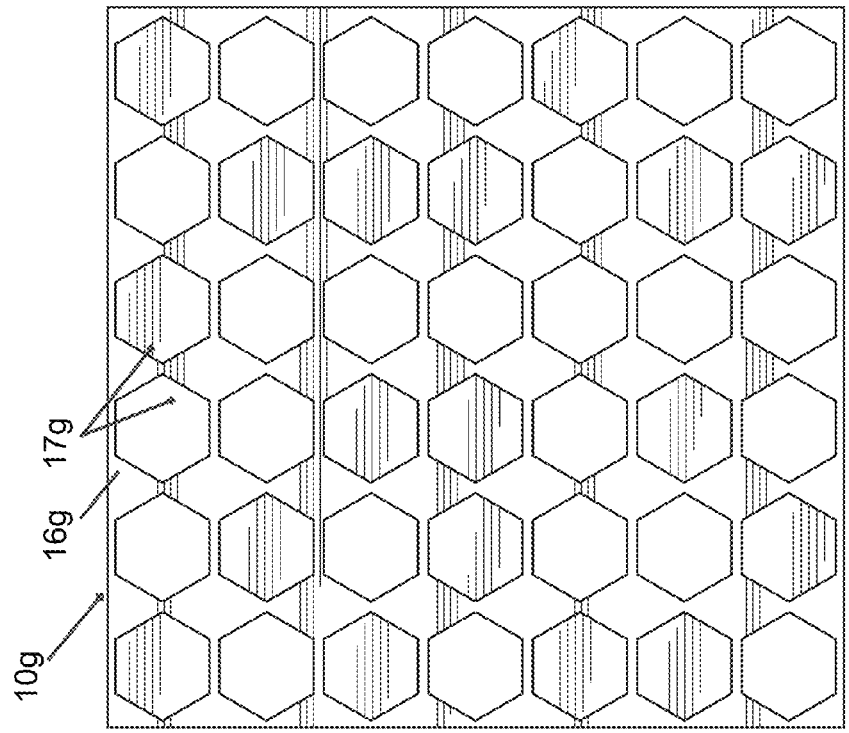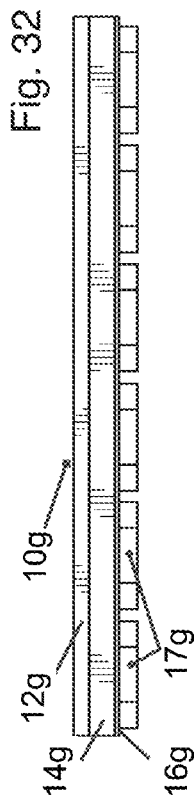

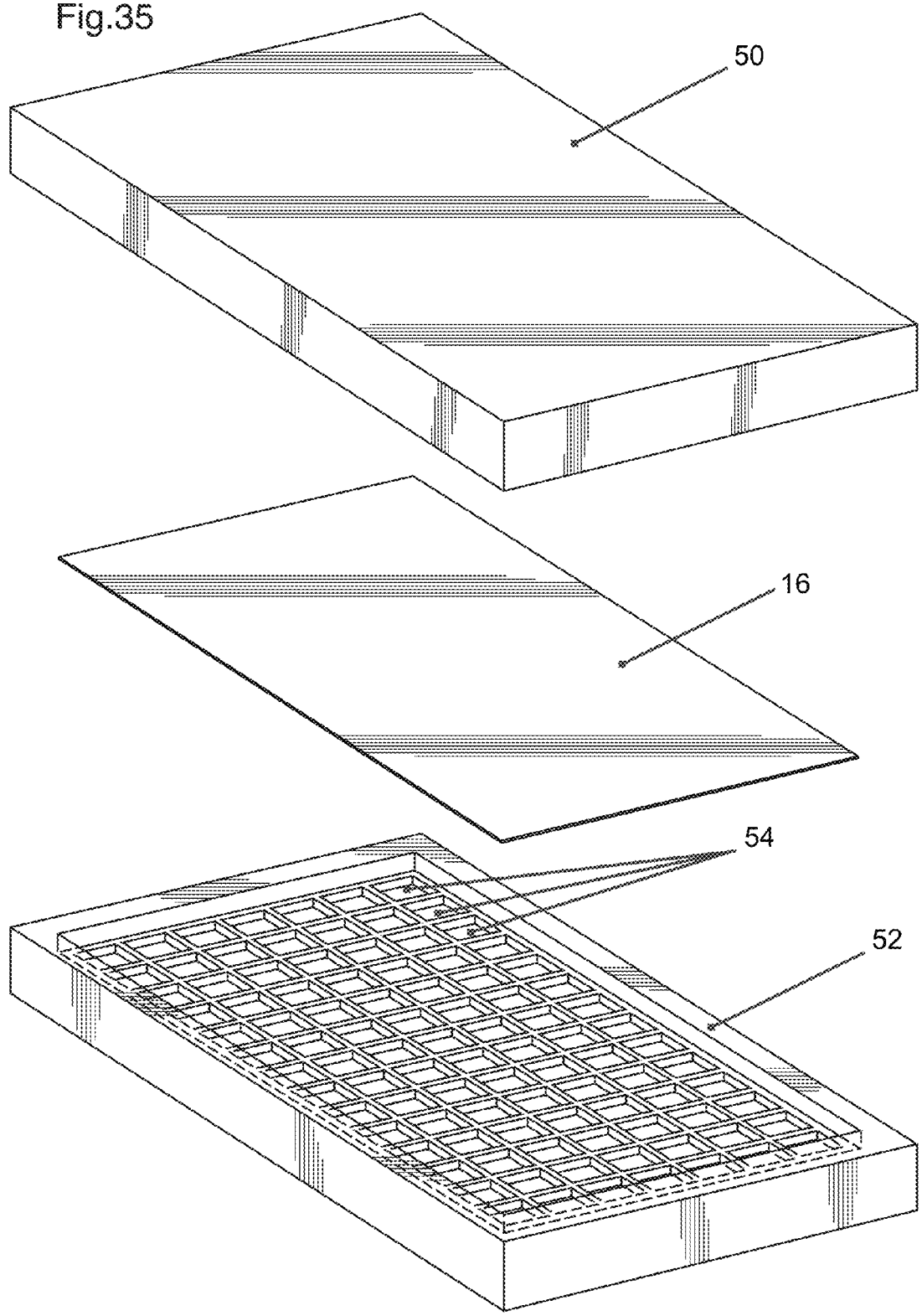

SUBFLOOR COMPONENT AND METHOD OF MANUFACTURING SAME

FIELD OF THE INVENTION

The following is directed in general to building construction and renovation, and more particularly to a subfloor component and a method of manufacturing a subfloor component.

BACKGROUND OF THE INVENTION

A subfloor component is a panel or other component meant to be placed on top of a concrete floor or other foundation before a finished floor of, for example, hardwood or tile is installed. The subfloor component may have projections for permitting the flow of moisture underneath the component so as to prevent moisture from standing underneath the subfloor component and causing problems with mold. While subfloor components of varying types are known, improvements are desirable.

SUMMARY OF THE INVENTION

According to an aspect, there is provided a subfloor component comprising an insulating foam panel having first and second opposing faces and a plurality of intersecting grooves to define, in cross-section, a plurality of pedestals having walls that extend into the panel from the first face toward the second face; a moisture-resistant film attached to the first face of the panel and that conforms to the pedestals; and a hardboard layer on the second face of the panel.

Advantageously, the subfloor component has a moisture-resistant film that conforms to the pedestals of the panel, such the when the pedestals are facing downwards against, for example, a concrete floor, moisture can travel along the concrete floor between the pedestals (ie. along channels formed by the grooves of the panel and the concrete floor) without seeping into the foam of the panel itself.

Enabling the moisture to travel along the channels enables drainage of the moisture that is on the concrete floor below the panel towards the edges of the panels, rather than form standing-water puddles on the concrete floor.

The attaching of the moisture-resistant film to the pedestals of the panel provides structural integrity to particularly the foam pedestals of the panel. Thus, while a subfloor component is being transported, or while the subfloor component is being compressed against, for example, a concrete floor during normal use, pieces of foam do not tend to break loose of the panel. In other words, the moisture-resistant film, in addition to preventing ingress of moisture into the panel, tends to keep the foam pedestals intact.

In one embodiment, the moisture-resistant film is fused to the panel, providing an even more integral structure.

The hardboard layer on the second surface of the panel provides a flat, integrated surface upon which to overlay further flooring made of wood, linoleum, ceramic, stone, cork, bamboo, eucalyptus or other material. The hardboard layer against the foam panel provides the combination of flatness, impact-absorption, sound absorption, insulation and resiliency suited well for floors in dwellings.

Multiple subfloor components may be installed on a concrete floor simply by setting them down on a concrete floor adjacent to each other, or even somewhat spaced from each other. However, in one embodiment, each subfloor component is shaped to connect to another subfloor component by way of tongues and grooves on respective edges of the hardboard layer. The subfloor components that are so interconnected can provide an overall more uniform surface flatness across subfloor components and discourage shifting of the subfloor components. This can be useful for overlaying further flooring. Other structures for interconnecting subfloor components may be employed. For example, pieces of dowel may be inserted into holes in the edges of the hardboard layers that are being installed adjacent to each other, with the dowel spanning between the adjacent subfloor components.

According to another aspect, there is provided a method of manufacturing a subfloor component, comprising providing a mold configured to form an insulating foam panel, the mold including pedestal-forming structures for forming a panel having, in cross-section, a plurality of pedestals with walls that extend into the panel from a first face of the panel toward a second opposing face of the panel; placing a moisture-resistant film into the mold against the pedestal-forming structures; placing heat-expandable beads into the mold against the moisture-resistant film opposite the pedestal-forming structures; applying heat to the mold to expand the heat-expandable beads to form the panel, wherein the expansion of the heat-expandable beads causes both the film and the expanding beads to enter into conform to the pedestal-forming structures thereby to form the pedestals of the panel with the moisture-resistant film fused thereto; removing the panel with the fused moisture-resistant film from the mold; and attaching a hardboard layer to the second face of the panel.

Having the beads and the film in the mold at the same time provides the opportunity for the film to fuse to the panel while the panel itself is being formed, and also causes the film to tightly conform to the pedestals at the same time. Providing fusing and conforming at the same time as panel formation is advantageous for expediting and simplifying the manufacturing of the subfloor component.

These together with other aspects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A detailed description of the preferred embodiment is set forth in detail below, with reference to the following drawings, in which:

FIG. 2 is a bottom view of the subfloor component of FIG. 1;

FIG. 3 is a side view of the subfloor component of FIG. 1;

FIG. 4 is an end view of the subfloor component of FIG. 1;

FIG. 6 is a perspective view of the underside of another embodiment of a subfloor component;

FIG. 7 is a bottom view of the subfloor component of FIG. 6;

FIG. 8 is a side view of the subfloor component of FIG. 6;

FIG. 9 is an end view of the subfloor component of FIG. 6;

FIG. 10 is a top view of the subfloor component of FIG. 6;

FIG. 11 is a bottom view of another embodiment of a subfloor component;

FIG. 12 is a side view of the subfloor component of FIG. 11;

FIG. 13 is an end view of the subfloor component of FIG. 11;

FIG. 14 is a top view of the subfloor component of FIG. 11;

FIG. 15 is a bottom view of another embodiment of a subfloor component;

FIG. 16 is a side view of the subfloor component of FIG. 15;

FIG. 17 is an end view of the subfloor component of FIG. 15;

FIG. 18 is a top view of the subfloor component of FIG. 15;

FIG. 19 is a bottom view of another embodiment of a subfloor component;

FIG. 20 is a side view of the subfloor component of FIG. 19;

FIG. 21 is an end view of the subfloor component of FIG. 19;

FIG. 22 is a top view of the subfloor component of FIG. 19;

FIG. 23 is a bottom view of another embodiment of a subfloor component;

FIG. 24 is a side view of the subfloor component of FIG. 22;

FIG. 25 is an end view of the subfloor component of FIG. 22;

FIG. 26 is a top view of the subfloor component of FIG. 22;

FIG. 27 is a bottom view of another embodiment of a subfloor component;

FIG. 28 is a side view of the subfloor component of FIG. 27;

FIG. 29 is an end view of the subfloor component of FIG. 28;

FIG. 30 is a top view of the subfloor component of FIG. 29;

FIG. 31 is a bottom view of another embodiment of a subfloor component;

FIG. 32 is a side view of the subfloor component of FIG. 31;

FIG. 33 is an end view of the subfloor component of FIG. 31;

FIG. 34 is a top view of the subfloor component of FIG. 31.

FIG. 35 is a perspective view of a moisture-resistant film layer being placed against pedestal-forming structures that are within one of the components of a mold structure during manufacture of the subfloor component of FIG. 1;

DETAILED DESCRIPTION OF THE PREFERRED EMBODIMENT

Figure 1:
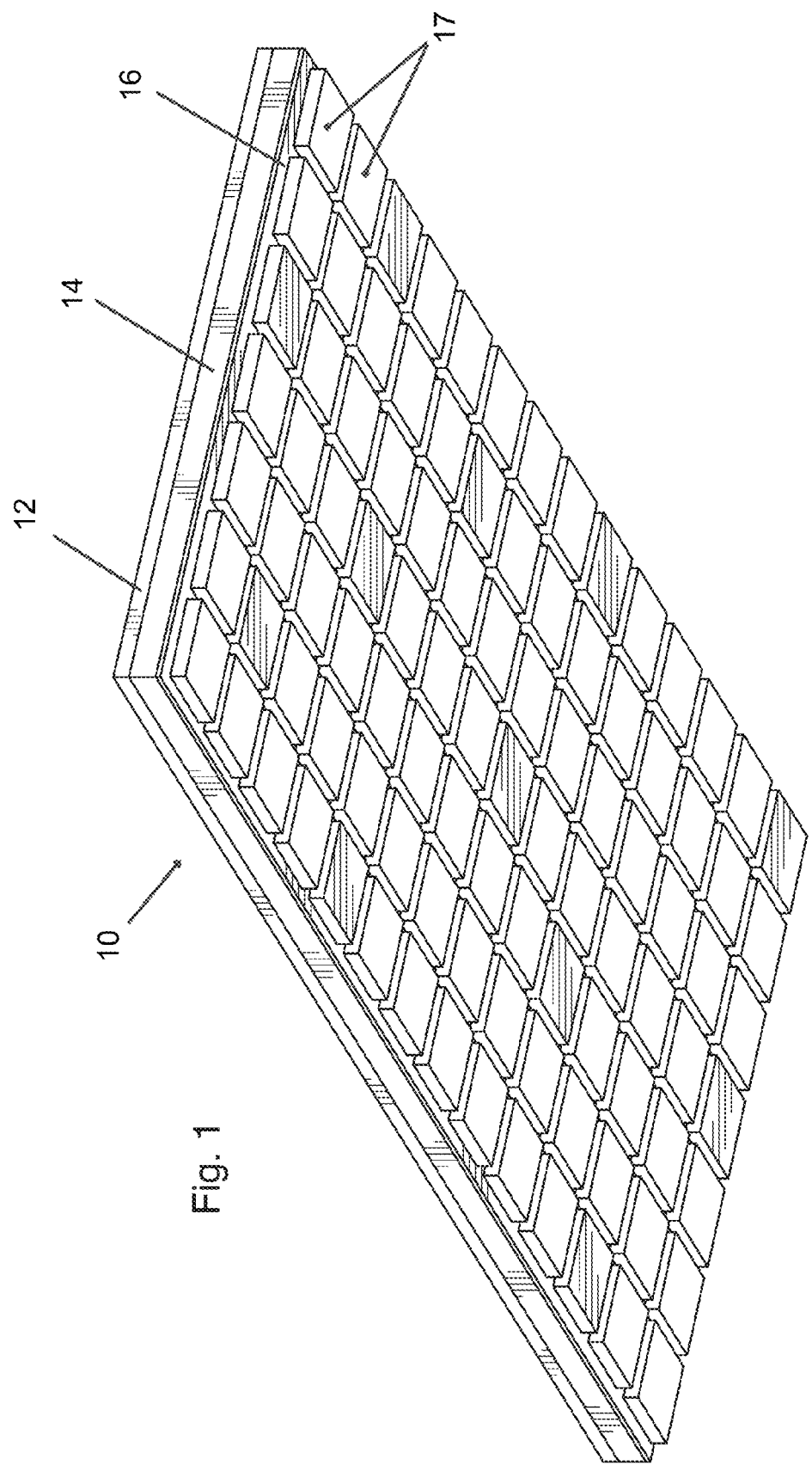
FIG. 1 is a perspective view of the underside of one embodiment of a subfloor component.
Figure 5:
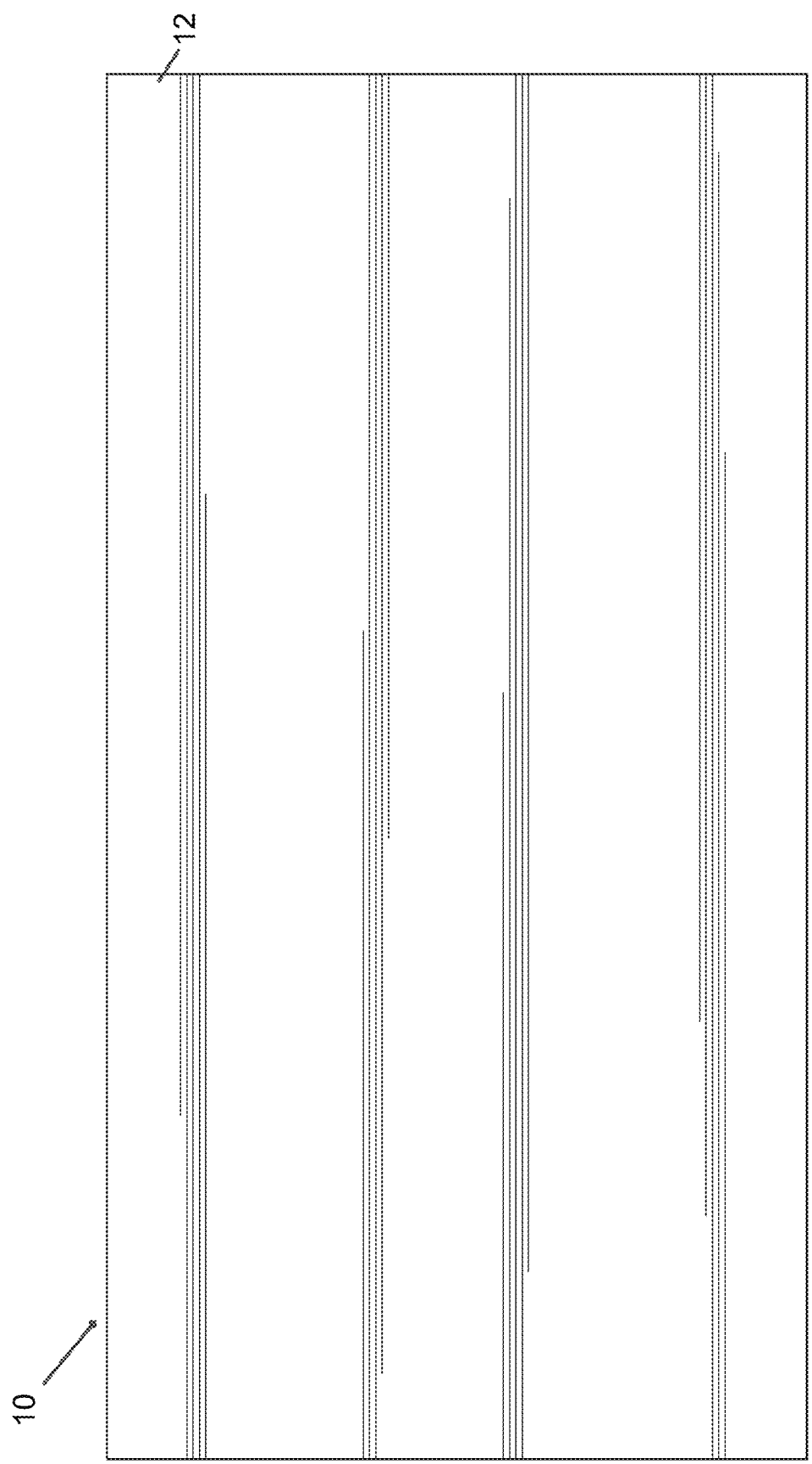
FIG. 5 is a top view of the subfloor component of FIG. 1.

In FIGS. 1 through 5, there is shown a subfloor component 10 according to an embodiment. Subfloor component 10 is rectangular in shape, and includes a hardboard panel 12, an insulating foam panel 14, and a moisture-resistant film 16. The insulating foam panel 14 includes first and second opposing faces. Multiple intersecting grooves in the first face define, in cross-section, multiple pedestals 17 that have walls that extend into the insulating foam panel 14 from the first face toward the second face. The moisture-resistant film 16 is attached to the first face of the panel and conforms to the pedestals 17. The hardboard layer 12 is on the second face of the panel, which is opposite the panel 14 from the first face.

In this embodiment, the hardboard panel 12 is oriented strand board (OSB), a material well-known to be employed in building construction. Also in this embodiment, the insulating foam panel 14 is formed of expanded polystyrene (EPS), and the hardboard panel 12 is glued to the insulating foam panel 14. Furthermore, in this embodiment the moisture-resistant film 16 is a thin layer of high-impact polystyrene.

In this embodiment, the moisture-resistant film 16 is fused to the insulating foam panel 14 such that the moisture-resistant film 16 is affixed to the top and walls of the pedestals 17 as well as to the bottom of the grooves. The subfloor component 10 is to be placed on a foundation floor or other such structure with the pedestals 17 downwards and with the moisture-resistant film 16 between the insulating foam layer 14 and the foundation floor. Moisture on the foundation floor is able to pass between the pedestals 17 and can contact the moisture-resistant film 16 in order to drain away from underneath the subfloor component 10. The moisture-resistant film layer 16 effectively resists the passage of moisture into the insulating foam panel 14 from the foundation floor thereby keeping the insulating foam panel 14 suitably dry.

The fusing of the moisture-resistant film 16 and the insulating foam panel 14 enables the pedestals 17 to which the moisture-resistant film is conforming to have increased resistance to breakage. As would be understood, as useful as expanded EPS is for insulation, it can be brittle. In this embodiment, the pedestals 17, which are shaped as squares, each have four (4) walls meeting at four (4) edges and four (4) top corners. Particularly the top corners and also the edges are most prone to being broken away during transportation, installation, or usage. The present inventor has discovered that, particularly for a subfloor component 10 that will be experiencing various physical pressures from above, advantages are gained by employing a moisture-resistant film 16 that not only resists moisture reaching the insulating foam panel 16 but conforms to the pedestals in order to provide drainage and also increase the structural integrity of the pedestals 17. In this way, physical pressures both during construction (workers, wheel barrows, other machinery) and when construction is complete (home owners, employees, couches, filing cabinets etc.) can be better withstood by the pedestals 17.

In this embodiment, the walls of the intersecting grooves have a height of about 15 millimeters, giving the pedestals 17 a corresponding height. However, other heights are possible. For example, other embodiments may provide heights of between about 15 millimeters to about 20 millimeters. Furthermore, in this embodiment, the intersecting grooves have a width of about 15 millimeters, giving the pedestals 17 a corresponding spacing. However, other widths are possible. For example, other embodiments may provide widths of between about 15 millimeters to about 20 millimeters. It will be understood that having all grooves have the same width is not required.

While the above-described subfloor component 10 can be useful for many purposes, the present inventor has also developed additional embodiments. For example, FIGS. 6 through 10 show a subfloor component 10a according to another embodiment. Subfloor component 10a is square in shape, and includes a hardboard panel 12a, an insulating foam panel 14a, and a moisture-resistant film 16a. Like the embodiment described in FIGS. 1 through 5, the insulating foam panel 14a includes first and second opposing faces. Multiple intersecting grooves in the first face define, in cross-section, multiple pedestals 17a that have walls that extend into the insulating foam panel 14a from the first face toward the second face. The moisture-resistant film 16a is attached to the first face of the panel and conforms to the pedestals 17a. The hardboard layer 12a is on the second face of the panel, which is opposite the panel 14a from the first face. As can be seen, subfloor component 10a is similar to subfloor component 10, but is square instead of rectangular.

FIGS. 11 through 14 show a subfloor component 10b according to another embodiment. Subfloor component 10b is square in shape, and includes a hardboard panel 12b, an insulating foam panel 14b, and a moisture-resistant film 16b. Like the embodiment described in FIGS. 1 through 5, the insulating foam panel 14b includes first and second opposing faces. Multiple intersecting grooves in the first face define, in cross-section, multiple pedestals 17b that each have at least one wall extending into the insulating foam panel 14b from the first face toward the second face. The moisture-resistant film 16b is attached to the first face of the panel and conforms to the pedestals 17b. The hardboard layer 12b is on the second face of the panel, which is opposite the panel 14b from the first face. As can be seen, subfloor component 10b is similar to subfloor component 10, but is square instead of rectangular. Furthermore, each of the pedestals 17b are circular, rather than square. The pedestals 17b being circular means that each pedestal 17b only has one wall, and thus there are no top corners. Because pedestal 17b does not have any top corners, breakage due to handling or use of the subfloor component 10b is even less likely.

FIGS. 15 through 18 show a subfloor component 10c according to another embodiment. Subfloor component 10c is square in shape, and includes a hardboard panel 12c, an insulating foam panel 14c, and a moisture-resistant film 16c. Like the embodiment described in FIGS. 1 through 5, the insulating foam panel 14c includes first and second opposing faces. Multiple intersecting grooves in the first face define, in cross-section, multiple pedestals 17c that each have at least one wall extending into the insulating foam panel 14c from the first face toward the second face. The moisture-resistant film 16c is attached to the first face of the panel and conforms to the pedestals 17c. The hardboard layer 12c is on the second face of the panel, which is opposite the panel 14c from the first face. As can be seen, subfloor component 10c is similar to subfloor component 10, but is square instead of rectangular. Furthermore, each of the pedestals 17c are oval-shaped, rather than square. The pedestals 17c being oval-shaped means that each pedestal 17c only has one wall, and thus there are no top corners. Because pedestal 17c does not have any top corners, breakage due to handling or use of the subfloor component 10c is less likely.

FIGS. 19 through 22 show a subfloor component 10d according to another embodiment. Subfloor component 10d is square in shape, and includes a hardboard panel 12d, an insulating foam panel 14d, and a moisture-resistant film 16d. Like the embodiment described in FIGS. 1 through 5, the insulating foam panel 14d includes first and second opposing faces. Multiple intersecting grooves in the first face define, in cross-section, multiple pedestals 17d that have walls that extend into the insulating foam panel 14d from the first face toward the second face. The moisture-resistant film 16d is attached to the first face of the panel and conforms to the pedestals 17d. The hardboard layer 12a is on the second face of the panel, which is opposite the panel 14d from the first face. As can be seen, subfloor component 10d is similar to subfloor component 10, but is square instead of rectangular. Furthermore, there are two different sizes of pedestals 17d, namely a thin rectangle and a thick rectangle.

FIGS. 23 through 26 show a subfloor component 10d according to another embodiment. Subfloor component 10e is square in shape, and includes a hardboard panel 12e, an insulating foam panel 14e, and a moisture-resistant film 16e. Like the embodiment described in FIGS. 1 through 5, the insulating foam panel 14e includes first and second opposing faces. Multiple intersecting grooves in the first face define, in cross-section, multiple pedestals 17e that have walls that extend into the insulating foam panel 14e from the first face toward the second face. The moisture-resistant film 16e is attached to the first face of the panel and conforms to the pedestals 17e. The hardboard layer 12e is on the second face of the panel, which is opposite the panel 14e from the first face. As can be seen, subfloor component 10e is similar to subfloor component 10, but is square instead of rectangular. Furthermore, the pedestals 17e are diamond-shaped.

FIGS. 27 through 30 show a subfloor component 10f according to another embodiment. Subfloor component 10f is square in shape, and includes a hardboard panel 12f, an insulating foam panel 14f, and a moisture-resistant film 16f. Like the embodiment described in FIGS. 1 through 5, the insulating foam panel 14f includes first and second opposing faces. Multiple intersecting grooves in the first face define, in cross-section, multiple pedestals 17f that have walls that extend into the insulating foam panel 14f from the first face toward the second face. The moisture-resistant film 16f is attached to the first face of the panel and conforms to the pedestals 17f The hardboard layer 12f is on the second face of the panel, which is opposite the panel 14f from the first face. As can be seen, subfloor component 10f is similar to subfloor component 10, but is square instead of rectangular. Furthermore, the pedestals 17f are all rectangles.

FIGS. 31 through 34 show a subfloor component 10g according to another embodiment. Subfloor component 10g is square in shape, and includes a hardboard panel 12g, an insulating foam panel 14g, and a moisture-resistant film 16g. Like the embodiment described in FIGS. 1 through 5, the insulating foam panel 14g includes first and second opposing faces. Multiple intersecting grooves in the first face define, in cross-section, multiple pedestals 17g that have walls that extend into the insulating foam panel 14g from the first face toward the second face. The moisture-resistant film 16g is attached to the first face of the panel and conforms to the pedestals 17g. The hardboard layer 12g is on the second face of the panel, which is opposite the panel 14g from the first face. As can be seen, subfloor component 10g is similar to subfloor component 10, but is square instead of rectangular. Furthermore, the pedestals 17g are all hexagons.

It will be understood that a subfloor component with pedestals of different shapes, including others not disclosed above, or mixtures of differently-shaped pedestals such as those described above, may be provided.

The various subfloor components described herein may generally be used alongside each other in a particular installation, provided that the overall thicknesses of two different panels are similar, and provided that using differently-shaped pedestals in two different subfloor components does not unduly impede the flow of moisture beneath the subfloor components. In one embodiment, subfloor components have tongue and groove configurations along the edges which abut against each other, such that the tongue of one panel can be received within the groove of the adjacent panel. The tongues/ grooves may have square, rectangular configurations with or without rounded distal corners.

Figure 40:
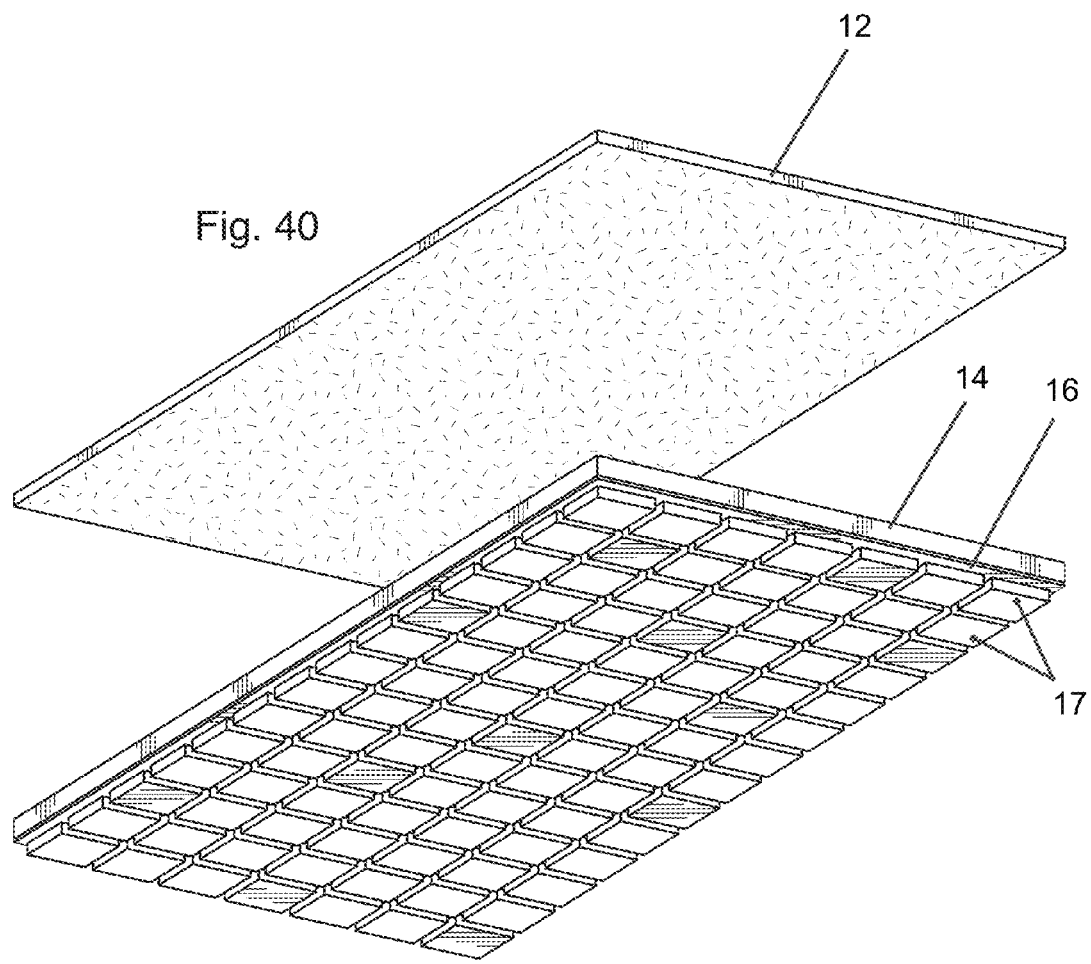
FIG. 40 is a perspective view of the hardboard layer being aligned with the face of the insulating foam panel that is opposite to the panel's pedestals.
Figure 41:
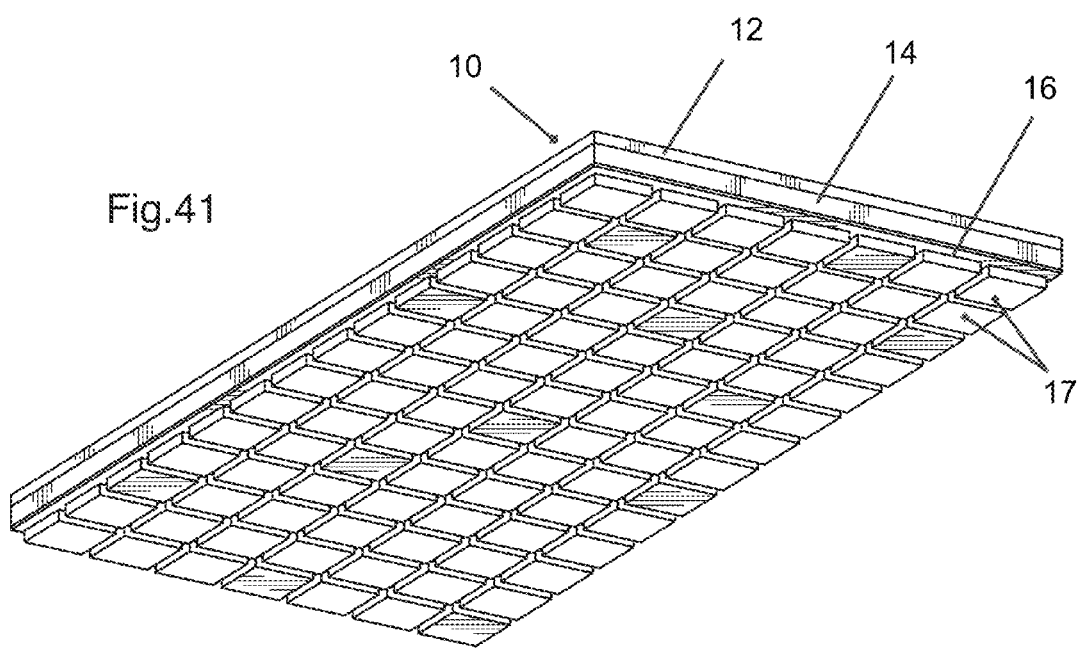
FIG. 41 is a perspective view of the subfloor component having been formed.
Figure 42:
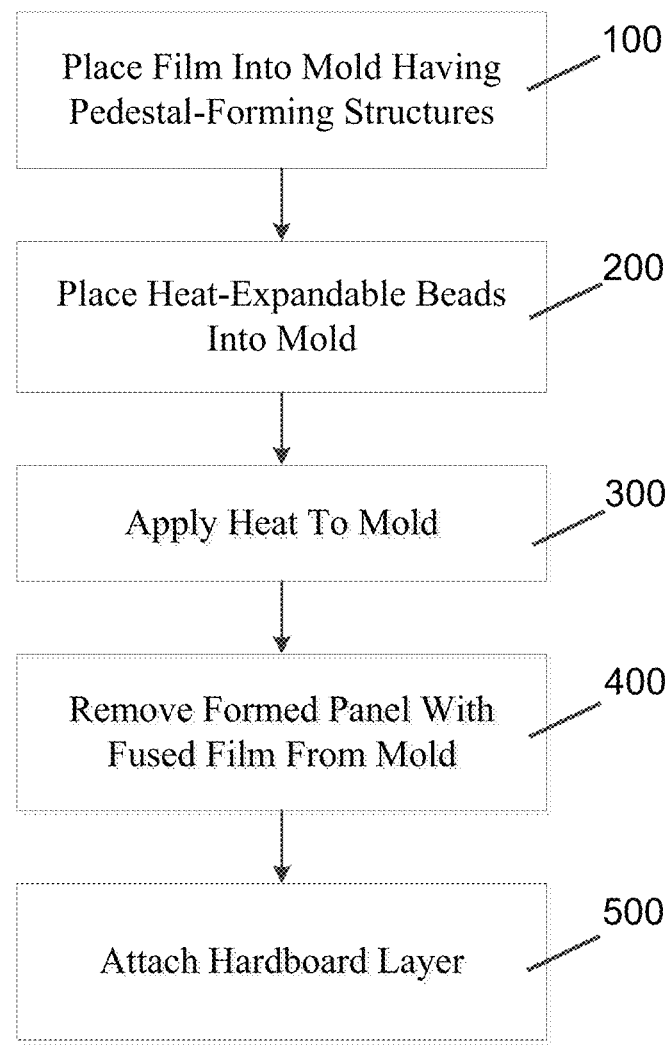
FIG. 42 is a flowchart of steps for manufacturing a subfloor component.

FIG. 42 shows a flowchart of steps of a method of manufacturing a subfloor component such as subfloor component 10 described above. The treatment of the materials involved in the steps are illustrated in FIGS. 35 through 41. In FIG. 35, a mold structure is shown have a top portion 50 and a bottom portion 52. It will be understood that the terms top and bottom may be interchanged with left and right, for example, in the case of a mold structure that stands vertically.

Figure 36:
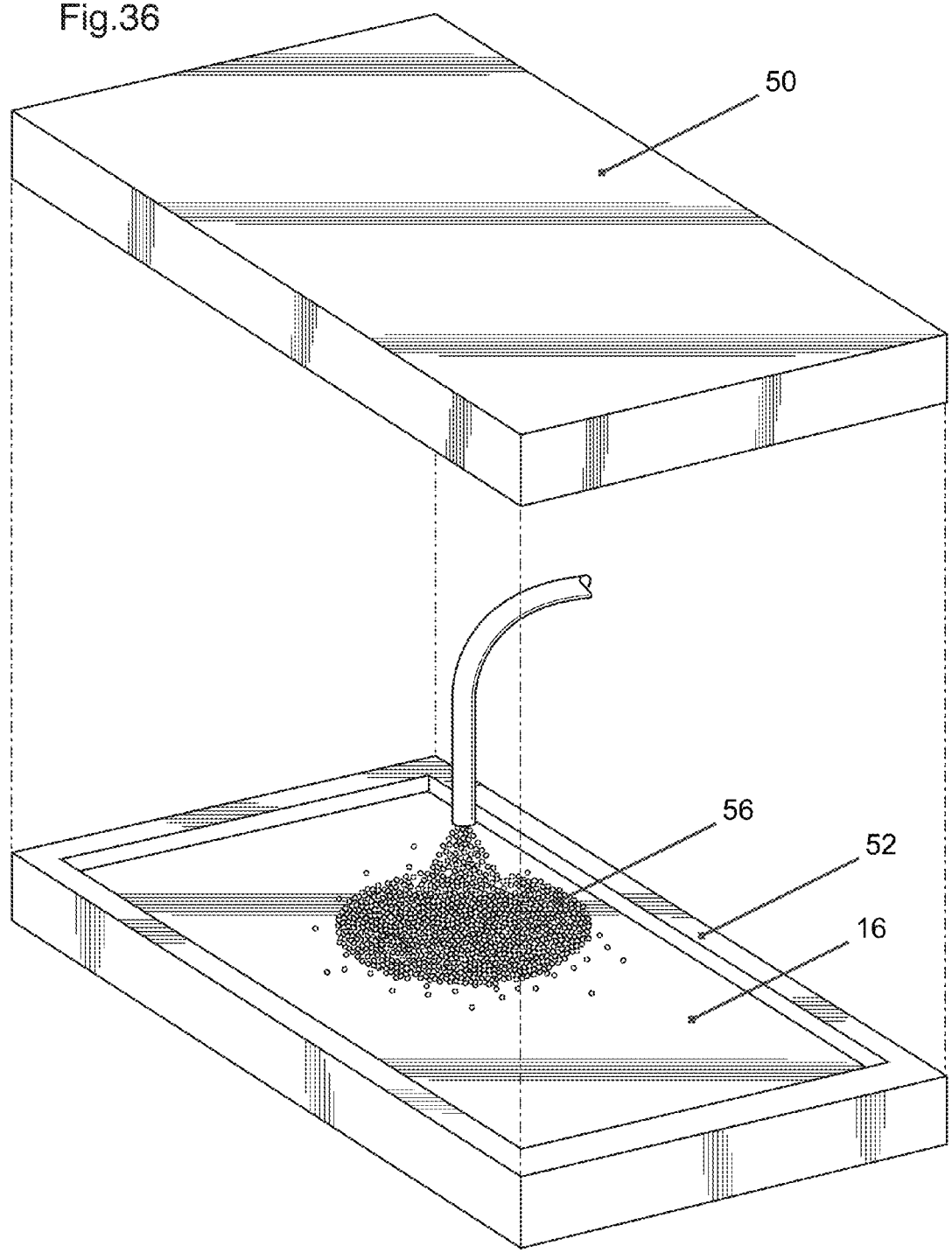
FIG. 36 is a perspective view of expandable polystyrene beads being poured into the mold structure atop the moisture-resistant film layer.
Figure 37:
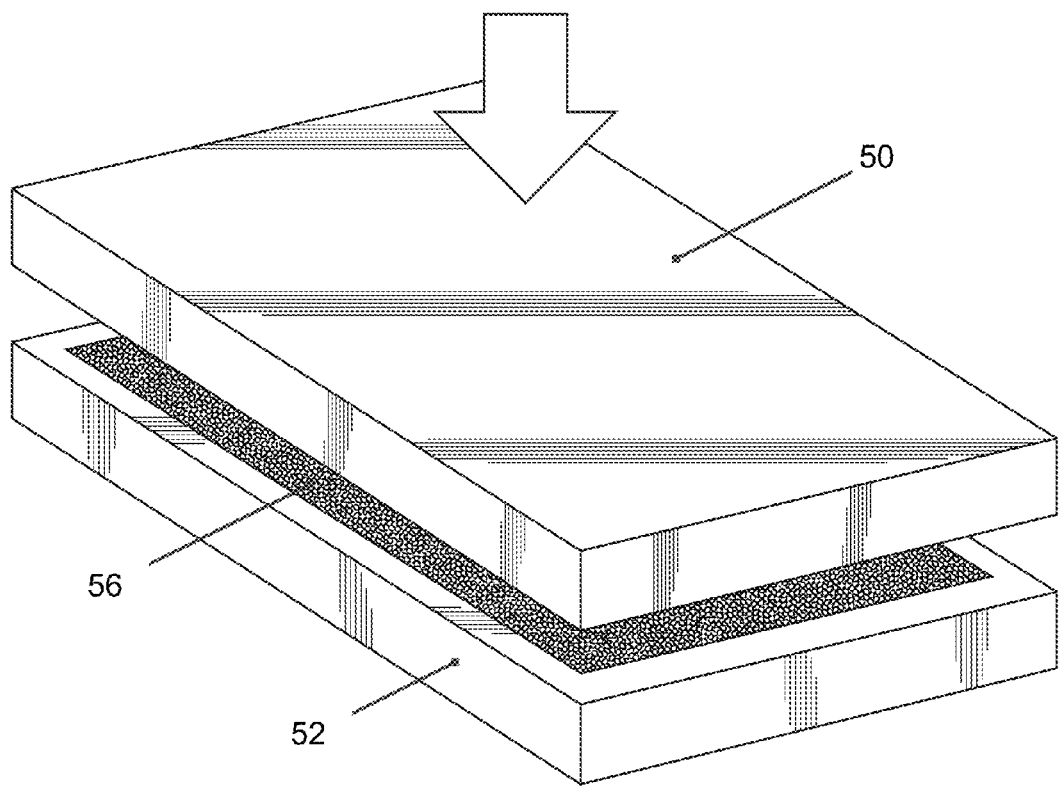
FIG. 37 is a perspective view of a mold structure being closed prior to applying heat to the mold.
Figure 38:
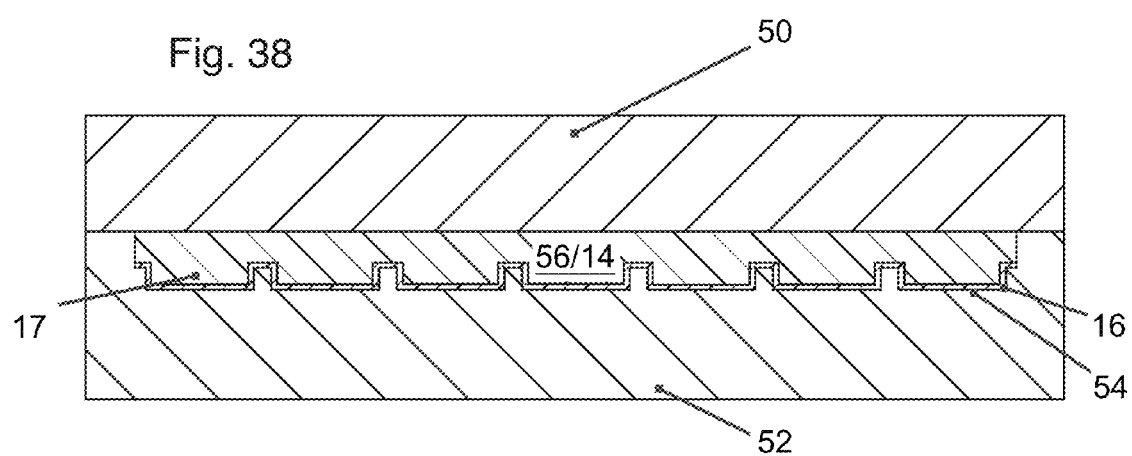
FIG. 38 is a cutaway view of the end of the mold structure enclosing the moisture-resistant film layer and the expandable polystyrene beads while the mold structure is being heated.

First, a generally-flat piece of moisture-resistant film 16 is placed within the bottom portion 52 of the mold structure on top of and therefore adjacent to pedestal-forming structures 54 (step 100), as shown in FIG. 35. The pedestal forming structures 52 are part of the mold structure and have a shape corresponding to the shape of the desired pedestals 17. With the moisture-resistant film 16 adjacent to the pedestal-forming structures 54, heat-expandable beads 56 are then placed into the mold structure on top of the moisture-resistant film 16 (step 200), as shown in FIG. 36. The heat-expandable beads are thus placed against a side of the moisture-resistant film 16 that is opposite the pedestal forming structures 54. As shown in FIG. 37, with the moisture-resistant film 16 and the heat-expandable beads 56 within the mold structure between top 50 and bottom 52 portions, the mold structure is then closed. At this point, heat is then applied to the mold structure (step 300) so as to cause the heat-expandable beads 56 to expand and fuse together. While the heat-expandable beads 56 are expanding to form the insulating foam panel 14, the pressure of the expansion causes both the moisture-resistant film 16 and the expanding beads 56 to enter into and conform to the pedestal-forming structures 54, as shown in the cutaway view of FIG. 38. The moisture-resistant film being of high-impact polystyrene fuses at its surface under the applied heat to the facing surface of the insulating foam panel 14 being formed.

Figure 39:
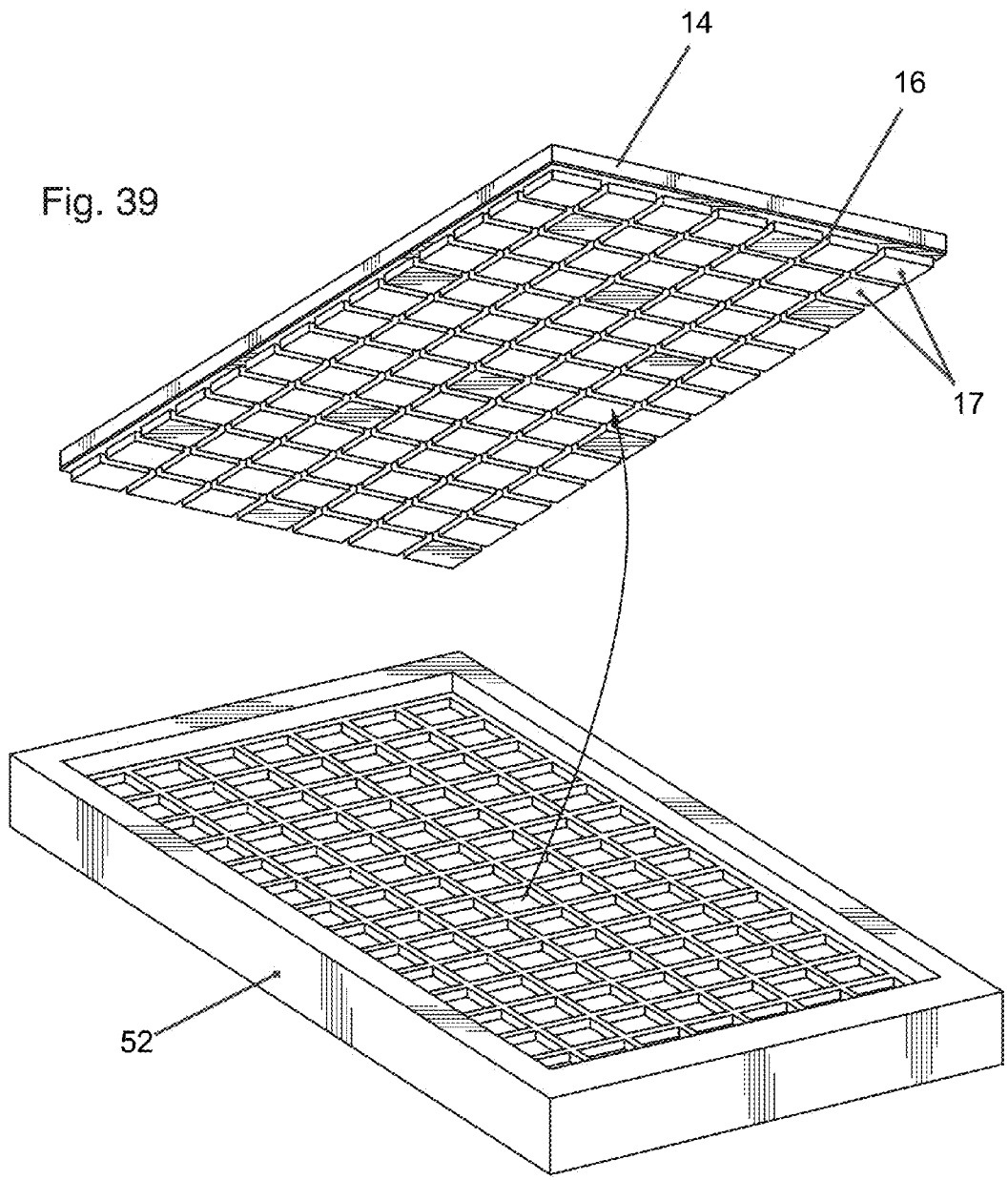
FIG. 39 is a perspective view of the insulating foam panel having been formed with pedestals within the mold and the moisture-resistant film layer fused to the panel's pedestals.

With the insulating foam panel 14 having been formed with pedestals 17 and having been fused to moisture-resistant film 16, as shown in FIG. 39, the combination is then removed from the mold structure (step 400). As shown in FIGS. 40 and 41, the hardboard layer 12 is then adhered to the combination that was removed from the mold structure, thereby to form the subfloor component 10.

The many features and advantages of the invention are apparent from the detailed specification and, thus, it is intended by the appended claims to cover all such features and advantages of the invention that fall within the true purpose of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, the moisture-resistant film may be made of other materials, such as polyethylene, or ABS (Acrylonitrile Butadiene Styrene). Furthermore, materials for the hardboard layer may be selected from plywood, fiber cement board, cement board, metal sheeting, and magnesium oxide board. Other materials, provided that they may be adhered to the insulating foam panel and provide a suitable amount of rigidity, may be employed for a hardboard layer.

Furthermore, while in the embodiments disclosed above the pedestals are generally uniformly distributed across the insulating foam panel, alternatives may be provided having pedestals that are not so uniformly distributed.

What is claimed is:

1. A subfloor component comprising:
    an insulating rigid foam panel having first and second opposing faces and a plurality of intersecting grooves to define, in cross-section, a plurality of pedestals, each pedestal having at least one wall extending into the panel from the first face toward the second face;
    a film of moisture-impervious material attached to the first face of the panel that conforms to the tops and walls of the pedestals and to the bottoms of the grooves; and
    a hardboard layer on the second face of the panel.

2. The subfloor component of claim 1, wherein the film is fused to the panel.

3. The subfloor component of claim 1, wherein the film comprises material selected from the group comprising plastic or polymer.

4. The subfloor component of claim 1, wherein each of the plurality of pedestals has a single wall.

5. The subfloor component of claim 4, wherein the pedestals are shaped as circles or ellipses.

6. The subfloor component of claim 1, wherein the panel comprises expanded polystyrene (EPS).

7. The subfloor component of claim 1, wherein the hardboard layer and the panel are attached to each other with glue.

8. The subfloor component of claim 1, wherein the intersecting grooves are rectangular.

9. The subfloor component of claim 8, wherein the walls of the intersecting grooves have a height of about 15 millimeters to about 20 millimeters.

10. The subfloor component of claim 8, wherein the width of the intersecting grooves is about 15 millimeters to about 20 millimeters.

11. The subfloor component of claim 1, wherein the pedestals are shaped as at least one of circles, ellipses, rectangles, diamonds, squares, and hexagons.

12. The subfloor component of claim 1, wherein the hardboard layer comprises material selected from the group consisting of: OSB (oriented strand board), plywood, fiber cement board, cement board, metal sheeting, and magnesium oxide board.

13. The subfloor component of claim 1, wherein the subfloor component is shaped to connect to another subfloor component.

14. The subfloor component of claim 13, wherein the hardboard layer comprises a tongue/groove configuration for connecting to another hardboard layer of another subfloor component.

15. The subfloor component of claim 1, wherein the pedestals are generally uniformly distributed across the first surface of the panel.

16. The subfloor component of claim 3, wherein the plastic or polymer is selected from the group consisting of: high-impact polystyrene, polyethylene, and ABS (Acrylonitrile Butadiene Styrene).

17. The subfloor component of claim 1, wherein the film is attached to at least one of: the tops of the pedestals, the walls of the pedestals, and the bottoms of the grooves.

18. The subfloor component of claim 1, wherein the film is attached to at least two of: the tops of the pedestals, the walls of the pedestals, and the bottoms of the grooves.

* * * * *